United States Patent [19]

Philips

[11] 4,383,143

[45] May 10, 1983

[54] MOLDED SHELLS FOR LUGGAGE AND THE LIKE

[75] Inventor: Gary Philips, Youngstown, Ohio

[73] Assignee: Airway Industries, Inc., Ellwood City, Pa.

[21] Appl. No.: 196,021

[22] Filed: Oct. 10, 1980

[51] Int. Cl.$^3$ .......................... A45C 5/02; B32B 17/06
[52] U.S. Cl. .......................................... 190/53; 190/40; 162/181.1; 162/181.6; 428/174; 428/182; 428/184; 428/325; 428/326; 523/219; 523/223; 524/13
[58] Field of Search ............... 428/325, 326, 174, 182, 428/184; 162/181 R, 181 C; 190/53, 40; 523/219, 223; 524/13

[56] References Cited

U.S. PATENT DOCUMENTS

| | | | |
|---|---|---|---|
| 3,108,926 | 10/1963 | Brown | 162/181 C |
| 3,230,184 | 1/1966 | Alford | 428/227 |
| 3,309,444 | 3/1967 | Schueler | 428/326 |
| 3,316,139 | 4/1967 | Alford | 428/227 |
| 3,707,434 | 12/1972 | Stayner | 428/325 |
| 3,769,126 | 10/1973 | Kolek | 428/325 |
| 4,011,130 | 3/1977 | Worden | 162/181 R |
| 4,097,648 | 1/1978 | Pringle | 428/326 |
| 4,282,120 | 8/1981 | Cisterni | 428/326 |
| 4,301,187 | 11/1981 | Burch | 428/326 |

*Primary Examiner*—Ellis P. Robinson
*Attorney, Agent, or Firm*—Buell, Blenko, Ziesenheim & Beck

[57] ABSTRACT

The specification discloses a shell for luggage and the like comprising wood fibers, glass fibers, paper scrap, glass beads, and plastic resin. The mixture is blended with water to form a slurry, is vacuum formed and is then molded under heat and pressure.

6 Claims, No Drawings

MOLDED SHELLS FOR LUGGAGE AND THE LIKE

This invention relates to molding of body shells for hard sided luggage and the like. More particularly, it relates to methods and to compositions for performing such molding.

In the manufacture of hard sided luggage it is customary to manufacture the body shells by molding and curing them followed by covering with sheet material and attachment of appropriate hardware, fittings, interior trim, etc. Such shells have been produced by blending various fibrous and filler material with a plastic resin and then molding the same under heat and temperature to form a shell. A previously used formula is as follows:

- 42% unbleached draft wood pulp
- 32% corrugated paper scrap
- 6% polyvinyl-acetate homopolymer
- 6% long fiber wood product
- ½% one-quarter inch chopped continuous strand glass filaments
- 4% wood chips
- 9½% shredded debarked wood I have discovered that the properties of shells made from such a formula may be significantly improved by omitting the long fiber wood product and by adding galss beads. I prefer to use glass beads which are microscopic in size and are hollow. It would be expected that elimination of fibrous product would tend to reduce the strength of the molded shells. Also, it would be expected that introduction of essentially spherical glass beads would not increase the structural properties of molded shells. It was fould, however, contrary to such expectations, that the use of such glass beads does in fact produce a superior product. It is believed that the glass beads penetrate into the interstices of the mix and thereby form a product which is without voids and which is denser and more solid than the prior product.

I provide a mixture comprising wood products, glass beads and a plastic resin. I prefer to provide wood products as a major constituent and glass beads and resin as minor constituents. I further prefer to provide glass strand in the mixture. In a presently preferred mixture I provide a major portion of wood products and corrugated paper scrap such that the amount of wood products and paper scrap taken together exceeds 80% to 85% of the weight of the mixture. In the presently preferred mixture approximately one-third of the mixture is corrugated paper scrap.

In a presently preferred embodiment of the invention I provide a mix of the following composition by weight:

- 42% unbleached kraft wood pulp
- 32% corrugated paper scrap
- 6% polyvinyl-acetate homopolymer
- 6% glass beads
- ½% one-quarter inch chopped continuous strand glass filaments
- 4% wood chips through 0.040 inch screen
- 9½% shredded debarked wood I may, however, vary the amounts of various constituents. I may, for example, provide a mixture having from about 6% to about 8% by weight of glass and from about 6% to 8% by weight of resin. Amounts of other materials may be judiciously varied without detracting from the practice of the invention.

In the manufacture of luggage shells I prefer to add glass beads to the resin and then to mix them in a pulper with other constituents. I prefer to provide about 800 gallons of water to each 117 pounds of material for mixing in the pulper. The pulper causes degradation and reduction in size of the wood products but not of the glass beads or the glass fibers. After mixing and blending in the pulper I prefer to add an additional 2,000 gallons of water and to agitate the mixture by bubbling of air therethrough. The pulp is then placed on a vacuum screen by which water is withdrawn from the pulp and the solids are shaped to the general configuration of the luggage shell. The shaped material is then transferred to a mold where the shell is formed by subjecting the material to heat and pressure in a mold.

I have found that when about 6% of glass beads and 6% resin are present they tend to infiltrate and fill out voids in the mix. When the amounts of glass beads and resin each exceed about 8% material tends to be thrown off and does not fully penetrate and lodge within voids in the shell. If the amount of glass beads and resin is less than about 6%, then the voids are not fully packed, leading to a reduction in strength of the molded shell.

While I have illustrated and described a present and preferred embodiment of my invention it is to be understood that I do not limit myself thereto and that my invention may otherwise be variously practiced within the scope of the following claims.

I claim:

1. A luggage shell and the like molded from a mixture comprising wood chips and fibers as a major constituent, and about 6% to 8% glass beads and about 6% to 8% plastic resin as minor constituents.

2. The shell of claim 1 in which the mixture has added thereto a small quantity of glass strand.

3. The shell of claim 1 in which the wood products include corrugated paper scrap.

4. The shell of claim 1 in which the glass fibers are present in amounts of about ½%.

5. The shell of claim 4 in which about one-third of the mixture is paper scrap.

6. A luggage shell and the like as set forth in claim 1 in which the plastic resin is a polyvinyl-acetate homopolymer.

* * * * *

UNITED STATES PATENT AND TRADEMARK OFFICE
CERTIFICATE OF CORRECTION

PATENT NO. : 4,383,143
DATED : May 10, 1983
INVENTOR(S) : GARY PHILIPS

It is certified that error appears in the above-identified patent and that said Letters Patent is hereby corrected as shown below:

Column 1, line 17, "draft" should be --kraft--.

Column 1, line 28, "galss" should be --glass--.

Column 1, line 34, "fould" should be --found--.

Signed and Sealed this

Ninth Day of August 1983

[SEAL]

Attest:

GERALD J. MOSSINGHOFF

Attesting Officer   Commissioner of Patents and Trademarks